(12) United States Patent
Anirudh et al.

(10) Patent No.: US 11,126,895 B2
(45) Date of Patent: Sep. 21, 2021

(54) MIMICKING OF CORRUPTION IN IMAGES

(71) Applicant: Lawrence Livermore National Security, LLC, Livermore, CA (US)

(72) Inventors: Rushil Anirudh, Dublin, CA (US); Peer-Timo Bremer, Livermore, CA (US); Jayaraman Jayaraman Thiagarajan, Milpitas, CA (US); Bhavya Kailkhura, Dublin, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 0 days.

(21) Appl. No.: 16/840,358

(22) Filed: Apr. 4, 2020

(65) Prior Publication Data

US 2020/0372308 A1 Nov. 26, 2020

Related U.S. Application Data

(60) Provisional application No. 62/851,511, filed on May 22, 2019.

(51) Int. Cl.
*G06K 9/62* (2006.01)
*G06N 3/08* (2006.01)

(52) U.S. Cl.
CPC ......... *G06K 9/6267* (2013.01); *G06K 9/6202* (2013.01); *G06K 9/6256* (2013.01); *G06N 3/08* (2013.01)

(58) Field of Classification Search
CPC .. G06K 9/6267; G06K 9/6256; G06K 9/6202; G06K 9/40; G06K 9/4628; G06K 9/00201; G06K 9/6257; G06K 9/6262; G06K 9/627; G06K 9/6271; G06K 9/6272; G06K 9/62–64; G06N 3/08;
(Continued)

(56) References Cited

U.S. PATENT DOCUMENTS 10,643,306 B2 * 5/2020 Hwang ................ G06N 3/0454
10,970,765 B2 * 4/2021 Fang ........................ G06N 3/08
(Continued)

OTHER PUBLICATIONS

"Generative Adversarial Networks Conditioned on Brain Activity Reconstruct Seen Images"; Ghislain St-Yves, 2018 IEEE International Conference on Systems, Man, and Cybernetics (Year: 2018).*
(Continued)

*Primary Examiner* — Michael S Osinski
(74) *Attorney, Agent, or Firm* — Perkins Coie LLP

(57) ABSTRACT

Methods and systems are provided to generate an uncorrupted version of an image given an observed image that is a corrupted version of the image. In some embodiments, a corruption mimicking ("CM") system iteratively trains a corruption mimicking network ("CMN") to generate corrupted images given modeled images, updates latent vectors based on differences between the corrupted images and observed images, and applies a generator to the latent vectors to generate modeled images. The training, updating, and applying are performed until modeled images that are input to the CMN result in corrupted images that approximate the observed images. Because the CMN is trained to mimic the corruption of the observed images, the final modeled images represented the uncorrupted version of the observed images.

45 Claims, 5 Drawing Sheets

(58) Field of Classification Search
CPC .... G06N 3/0454; G06N 3/0472; G06N 3/084; G06N 3/088; G06N 3/04; G06N 3/0445; G06N 3/0481; G06N 3/082; G06T 2207/20084; G06T 2207/20081; G06T 2207/10004; G06T 2207/20076; G06T 3/4046; G06T 5/001–50
See application file for complete search history.

(56) References Cited

U.S. PATENT DOCUMENTS

| | | | | |
|---|---|---|---|---|
| 2015/0063685 | A1* | 3/2015 | Chen | G06K 9/66 382/156 |
| 2016/0292589 | A1* | 10/2016 | Taylor, Jr. | G06F 16/1744 |
| 2018/0225812 | A1* | 8/2018 | DiVerdi | G06K 9/4628 |
| 2018/0293496 | A1* | 10/2018 | Vogels | G06K 9/6298 |
| 2018/0293711 | A1* | 10/2018 | Vogels | G06T 15/005 |
| 2019/0026869 | A1* | 1/2019 | Gupta | G06T 5/003 |
| 2019/0130279 | A1* | 5/2019 | Beggel | G06N 3/0454 |
| 2019/0236759 | A1* | 8/2019 | Lai | G06K 9/6257 |
| 2019/0251612 | A1* | 8/2019 | Fang | G06N 3/08 |
| 2019/0294961 | A1* | 9/2019 | Zuev | G06K 9/6255 |
| 2020/0097772 | A1* | 3/2020 | Nakanishi | G06K 9/40 |
| 2020/0126192 | A1* | 4/2020 | Munkberg | G06N 3/08 |
| 2020/0237284 | A1* | 7/2020 | Kopparapu | A61B 5/7267 |
| 2020/0349680 | A1* | 11/2020 | Tao | G06T 5/50 |
| 2020/0349682 | A1* | 11/2020 | Mayol Cuevas | G06N 3/08 |
| 2020/0364842 | A1* | 11/2020 | Chaton | G06N 3/08 |
| 2020/0372608 | A1* | 11/2020 | Lee | G06T 7/13 |
| 2020/0380338 | A1* | 12/2020 | Matsumura | G06K 9/6221 |
| 2020/0412385 | A1* | 12/2020 | Arikan | H03M 13/13 |
| 2021/0049397 | A1* | 2/2021 | Chen | G06K 9/00718 |
| 2021/0049739 | A1* | 2/2021 | Schroers | G06T 3/4046 |
| 2021/0067801 | A1* | 3/2021 | Schroers | H04N 19/597 |
| 2021/0073630 | A1* | 3/2021 | Zhang | G06N 3/084 |
| 2021/0073955 | A1* | 3/2021 | Zhang | G06T 5/009 |
| 2021/0099715 | A1* | 4/2021 | Topiwala | H04N 19/103 |

OTHER PUBLICATIONS

"Semantic Image Inpainting with Deep Generative Models"; Raymond A. Yeh, 2017 IEEE Conference on Computer Vision and Pattern Recognition (Year: 2017).*

"Noise2Noise: Learning Image Restoration without Clean Data"; Jaakko Lehtinen, arXiv:1803.04189v3 [cs.CV] Oct. 29, 2018 (Year: 2018).*

Abadi, M., et al.: Tensorflow: Large-scale machine learning on heterogeneous distributed systems. arXiv preprint arXiv: 1603.04467 (2016).

Abdal, R., et al., Image2StyleGAN: How to embed images into the StyleGAN latent space? arXiv preprint arXiv: 1904.03189 (2019).

Akcay, S., et al., Ganomaly: Semi-supervised anomaly detection via adversarial training. arXiv preprint arXiv:1805.06725 (2018).

An, J., et al., Variational autoencoder based anomaly detection using reconstruction probability. Special Lecture on IE 2. 1-18 (2015).

Athalye, A., et al., Obfuscated gradients give a false sense of security: Circumventing defenses to adversarial examples. arXiv preprint arXiv: I 802.00420(2018).

Azulay, A et al..,: Why do deep convolutional networks generalize so poorly to small image transformations? arXiv preprint arXiv:1805.12177 (2018).

Becker, B., et al., Evaluating open-universe face identification on the web. In: Proceedings of the IEEE Conference on Computer Vision and Panern Recognition Workshops, pp. 904-911 (2013).

Bigganex: A dive into the latent space of biggan (2018). URL https://thegradient.pub/bigganex-a-dive-into-the-latent-space-of-biggan/.

Bojanowski, P., et al..,: Optimizing the latent space of generative networks. arXiv preprint arXiv:1707.05776 (2017).

Bora, A. et al., "AmbientGAN: Generative models from lossy measurements." In International Conference on Learning Representations, 2018. 22 pages.

Brock, A., et al..: Large scale gan training for high fidelity natural image synthesis. arXiv preprint arXiv: 1809.11096 (2018).

Carlini, N., et al.: Towards evaluating the robustness of neural networks. In: 2017 IEEE Symposium on Security and Privacy (SP), pp. 39-57. IEEE(2017).

Donahue, J., et al.: Adversarial feature learning. arXiv preprint arXiv:1605.09782 (2016).

Dumoulin, V., et al.: Adversarially learned inference. arXiv preprint arXiv:1606.00704 (2016).

Fernando, B., et al.: Unsupervised visual domain adaptation using subspace alignment. In: Proceedings of the IEEE international conference on computer vision, pp. 2960-2967 (2013).

Goodfellow, I.J. et al., Generative adversarial nets. In Advances in neural information processing systems (NIPS), pp. 2672-2680, 2014.

Goodfellow, I.J. et al.: Explaining and harnessing adversarial examples. CoRR abs/1412.6572 (2014). URL http://arxiv.org/abs/1412.6572.

He, K. et al., Deep residual learning for image recognition. Ta: Proceedings of the IEEE conference on computer vision and pattern recognition, pp. 770-778 (2016).

Hogan, A. et al..: Universal decision-based black-box perturbations: Breaking security-through-obscurity defenses. arXiv preprint arXiv:1811.03733 (2018).

Hoshen, Y., et al.: Nam: Non-adversarial unsupervised domain mapping. In: Proceedings of the European Conference on Computer Vision (ECCV), pp. 436-451 (2018).

Hoshen, Y.: Non-adversarial mapping with vaes. In: Advances in Neural Information Processing Systems, pp. 7528-7537 (2018).

Huang, G.B., et al.: Labeled faces in the wild: A database for studying face recognition in unconstrained environments. Tech. Rep. 07-49, University of Massachusetts, Amherst (2007).

Ilyas. A. et al.: The robust manifold defense: Adversarial training using generative models. arXiv preprint arXiv: I 712.09196 (2017).

Isola, P., et al.: Image-to-image translation with conditional adversarial networks. In: 20I 7 IEEE Conference on Computer Vision and Pattern Recognition (CVPR), pp. 5967-5976. IEEE (2017).

Jaderberg, M., et al.: Spatial transformer networks. In: Advances in neural information processing systems, pp. 2017-2025 (2015).

Karras, T., et al.: A style-based generator architecture for generative adversarial networks. arXiv preprint arXiv:1812.04948 (2018).

Kingma, D.P. et al., "A method for stochastic optimization." International Conference on Learning Representations ICLR, 2014. 15 pages.

Kulkarni, K. et al., "ReconNet: Non-iterative reconstruction of images from compressively sensed measurements." In Proceedings of the IEEE Conference on Computer Vision and Pattern Recognition, pp. 449-458, 2016.

Kurakin, A., et al.: Adversarial examples in the physical world. arXiv preprint arXiv:1607.02533 (2016).

Larsen, A.B.L., et al., Q.: Autoencoding beyond pixels using a learned similarity metric. arXiv preprint arXiv: 1512.09300 (2015).

Lecun, Y. et al., "The MNIST Database of handwritten digits." http://yann. lecun. com/exdb/mnist/, 1998.9 pages.

Ledig, C. et al., "Photo-realistic single image super-resolution using a generative adversarial network." May 25, 2017, 19 pages.

Lipton, Z.C., et al.: Precise recovery of latent vectors from generative adversarial networks. arXiv preprint arXiv: 1702.04782 (2017).

Liu, M.Y., et al.: Unsupervised image-to-image translation networks. In: Advances in Neural Information Processing Systems, pp. 700-708 (2017).

Liu, Z. et al., Deep learning face attributes in the wild. In Proceedings of International Conference on Computer Vision (ICCV), 2015. 9 pages.

Madry, A., et al..: Towards deep learning models resistant to adversarial attacks. In International Conference on Learning Representations (2018). URL https://openreview.net/=orure?id=rJzlBfZAb.

Moosavi-Dezfooli, S.M., et al.: Deepfool: a simple and accurate method to fool deep neural networks. In: Proceedings of the IEEE Conference on Computer Vision and Pattern Recognition, pp. 2574-2582 (2016).

Moosavi-Dezfooli, S.M., et al.: Universal adversarial perturbations. arXiv preprint (20 17).

(56) References Cited

OTHER PUBLICATIONS

Papernot N., et al.: cleverhans v 1.0.0: an adversarial machine learning library. arXiv preprint arXiv:1610.00768 (2016).
Pathak, D. et al., "Context encoders: Feature learning by inpainting." In Proceedings of the IEEE Conference on Computer Vision and Pattern Recognition, pp. 2536-2544, 2016. 9 pages.
Pinto, N., et al..: Scaling up biologically inspired computer vision: A case study in unconstrained face recognition on facebook. In: CVPR 2011 WORKSHOPS. pp. 35-42. IEEE (201 I).
Radford, A. et al., "Unsupervised representation learning with deep convolutional generative adversarial networks." International Conference on Learning Representations (ICLR), 2016. 16 pages.
Ribes, A. et al., "Linear inverse problems in imaging." IEEE Signal Processing Magazine, 25(4), 2008. 16 pages.
Russakovsky, 0., et al.: Imagenet large scale visual recognition challenge. International Journal of Computer Vision 115(3), 2 11-252 (20 15).
Samangouei, P., et al.: Defense-gan: Protecting classifiers against adversarial attacks using generative models. arXiv preprint arXiv:1805.06605 (2018).
Santhanam. G.K.. et al.: Defending against adversarial attacks by leveraging an entire gan, arXiv preprint arXiv: 1805.10652 (2018).
Seguy. V et al.: Large-scale optimal transport and mapping estimation. arXiv preprint arXiv: 1711.02283 (2017).
Shah, V. et al., "Solving linear inverse problems using gan priors: An algorithm with provable guarantees." arXiv preprint arXiv:1802.08406, 2018. 5 pages.
Stylegan—encoder for official tensorflow implementation (2019). URL https://github.com/Puzer/stylegan-encoder.
Thiagarajan, J.J. et al., "Mixing matrix estimation using discriminative clustering for blind source separation." Digital Signal Processing, 23(1):9-18, 2013.
Thiagarajan, J.J. et al., "Optimality and stability of the k-hyperline clustering algorithm." Pattern Recognition Letters, 32(9):1299-1304, 2011. 6 pages.
Thiagarajan, J.J., et al. "Image Understanding Using Sparse Representations." Synthesis Lectures on Image, Video, and Multimedia Processing, 2014, Publisher Morgan & Claypool, 120 pages.
Ulyanov, D. et al., "Deep Image Prior." Skolkovo Inst. of Science and Technology, Feb. 4, 2020, 23 pages.
Xiao, H., et al.: Fashion-mnist: a novel image dataset for benchmarking machine learning algorithms (2017).
Xie, J. et al., "Image denoising and inpainting with deep neural networks." In Advances in neural information processing systems, pp. 341-349, 2012.
Yeh, R.A., et al., Semantic image inpainting with deep generative models. In Proceedings of the IEEE Conference on Computer Vision and Pattern Recognition, pp. 5485-5493. 2017.
Zenati, H., et al. Efficient gan-based anomaly detection. arXiv preprint arXiv:1802,06222 (2018).
Zhu, J.Y.: Unpaired image-to-image translation using cycle-consistent adversarial networks. Tn: Proceedings of the IEEE international conference on computer vision, pp. 2223-2232 (2017).
Anirudh, R. et al., "Lose the views: Limited angle CT reconstruction via implicit sinogram completion." Lawrence Livermore National Laboratory, Jul. 11, 2018, 16 pages.
Asim, M. et al., "Solving bilinear inverse problems using deep generative priors." Dept. of Electrical Engineering, Information Technology University, Pakistan, Feb. 12, 2018, 9 pages.
Bora, A. et al., "Compressed sensing using generative models." Univ. of Texas at Austin, Dept. of Computer Science, Mar. 9, 2017, 24 pages.
Chang, J.H.R. et al., "One network to solve them all-solving linear inverse problems using deep projection models." Carnegie Mellon University, Pittsburgh, PA, Mar. 29, 2017, 12 pages.
Kingma, D.P. et al., "Auto-encoding variational bayes." Universiteit van Amsterdam, May 1, 2014, 14 pages.

* cited by examiner

MIMICKING OF CORRUPTION IN IMAGES

CROSS-REFERENCE TO RELATED APPLICATION

This application claims the benefit of priority to U.S. Provisional Patent Application No. 62/851,511 filed on May 22, 2019, which is hereby incorporated by reference in its entirety.

STATEMENT REGARDING FEDERALLY SPONSORED RESEARCH

The United States government has rights in this invention pursuant to Contract No. DE-AC52-07NA27344 between the U.S. Department of Energy and Lawrence Livermore National Security, LLC, for the operation of Lawrence Livermore National Laboratory.

BACKGROUND

Due to the tremendous success of deep learning, data scientists have employed deep learning in many applications. Deep learning algorithms have been used to identify characteristics of an object based on an image of the object. For example, deep learning classifiers have been employed to identify the species of an animal (e.g., cat or dog) given an image of the animal. A classifier may be trained using training data that includes images of animals that are each labeled with its species in a process referred to a supervised learning. As another example, deep learning regressors have been employed to identify the strength of a structure (e.g., between 0 and 1) given an image of the structure. Like a classifier, a regressor may be training using supervised learning.

Generative Adversarial Networks ("GANs") have been used in many applications such as super resolution, image editing, and image-to-image translation. The widespread use of GANs is due in part to their ability to parameterize complex, high-dimensional, non-linear image manifolds. The accurate parameterization of an image manifold provides a powerful regularization ("GAN prior") for a range of problems such as defense against adversarial attacks, anomaly detection, and compressive sensing. Despite the variabilities in their goals and formulations of these applications, an overarching requirement of these applications is the ability to project an observed image onto the image manifold at test time (e.g., after training).

The projecting of an image onto an image manifold involves an encoding step to represent the image as a latent vector in the latent space of a generator, followed by a decoding step to obtain the image from the image manifold given the latent vector. The decoding is typically carried out using a pre-trained generator model (e.g., convolutional neural networks ("CNNs")). The encoding step is typically implemented using two distinct family of approaches: (1) projected gradient descent ("PGD") and (2) a GAN coupled with an explicit encoder. The PGD approach is a powerful, latent space optimization strategy that minimizes the discrepancy between an observed image and the best estimate of that observed image from the generator. A GAN coupled with an explicit encoder includes an additional network that explicitly provides a latent space representation for an image. Other approaches may employ different generative modeling techniques such as variational autoencoders (VAEs).

Although these techniques have been shown to provide effective projections, they often fail in conditions in which the sample to be projected has undergone even (1) small distribution shifts compared to the data used for training the generator or (2) simple corruptions such as missing pixels, translation, rotation, or scale. In practice, both PGD and a GAN coupled with an explicit decoder fail drastically under these conditions. Moreover, while existing solutions such as unsupervised image-to-image translation have been successful in modeling complex distributional shifts across image domains, they rely on the availability of a large set of samples from the two domains. It would be desirable to have an approach that does not require samples from two domains and that is robust to simpler distribution shifts (e.g., affine transformations, corruptions, or missing information) that necessitate robust projections even when just a single sample is available from the corrupted domain at test time.

DETAILED DESCRIPTION

Methods and systems are provided to generate an uncorrupted version of an image given an observed image that is a corrupted version of the image. In some embodiments, a corruption mimicking ("CM") system iteratively trains a corruption mimicking network ("CMN") to generate corrupted images given modeled images, updates latent vectors based on differences between the corrupted images and observed images, and applies a generator to the latent vectors to generate modeled images. The training, updating, and applying are performed until modeled images that are input to the CMN result in corrupted images that approximate the observed images. Because the CMN is trained to mimic the corruption of the observed images, the final modeled images represented the uncorrupted version of the observed images.

Given a collection of observed images and an initialized latent vector for each observed image, the CM system initially applies the generator, which may be trained using a GAN, to the latent vectors to generate initial modeled images. The CM system then iteratively trains the CMN and learns latent vectors until an overall termination criterion (e.g., a certain number of overall iterations) is satisfied. The CM system trains the CMN given modeled images to minimize differences between corrupted images output by the CMN and the observed images. The goal is to have the modeled images converge on the uncorrupted versions of the observed images. To train the CMN, the CM system iteratively applies a gradient descent technique to update parameters of the CMN based on a loss function representing the differences between the last corrupted images output by the CMN and the observed images. After the CMN is trained, the CM system learns latent vectors that represent uncorrupted version of the observed images. To learn the latent vectors, the CM system iteratively applies a gradient descent technique to update the latent vectors based on the loss function, applies the generator to the latent vectors to generate modeled images, and applies the CMN to generate corrupted images for use in calculating the loss function that is used during the next iteration. When the overall termination criterion is satisfied, the images generated by applying the generator to the latent vectors as last updated represent uncorrupted versions of the observed images.

Figure 1:
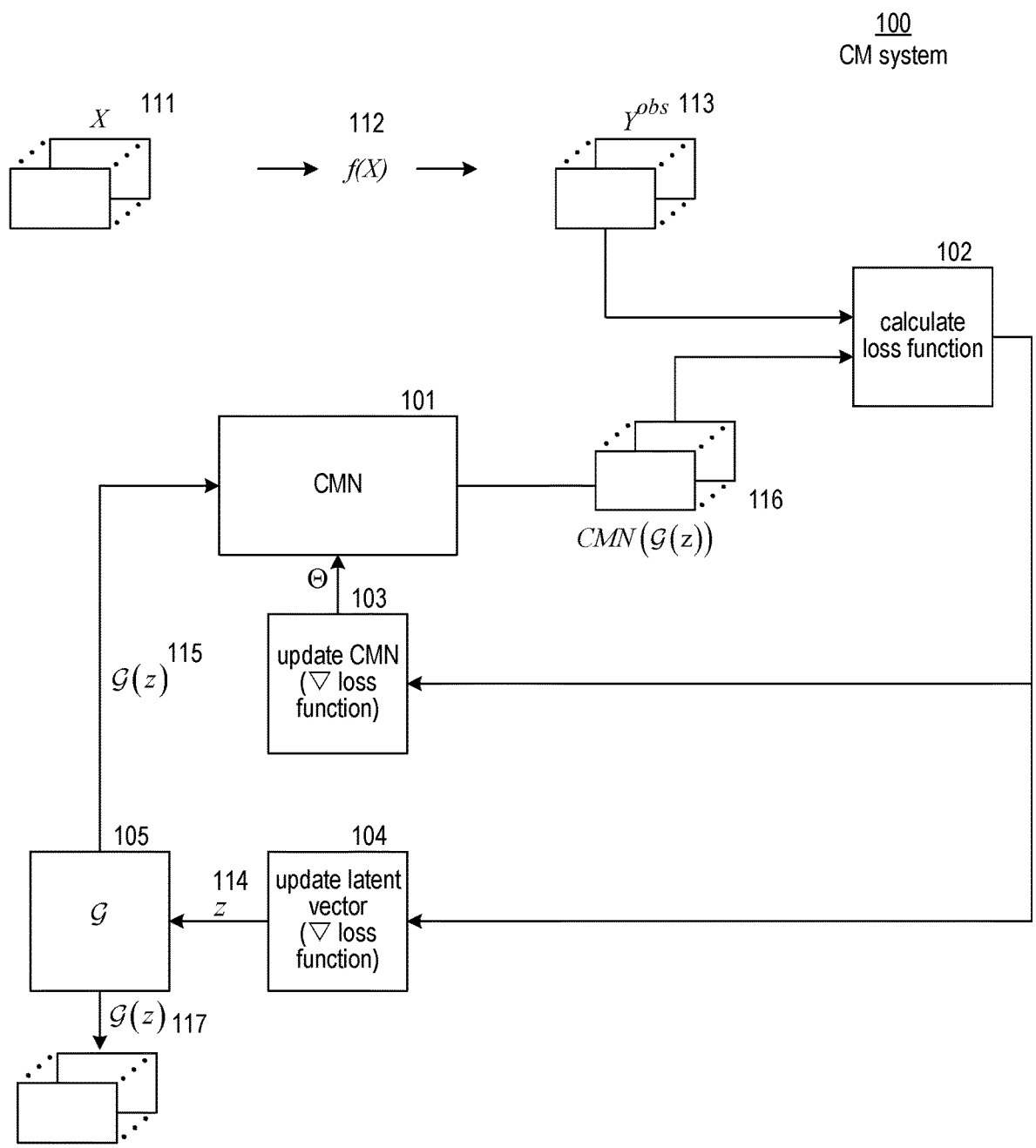
FIG. 1 is a block diagram that illustrates the overall operation of the CM system.

FIG. 1 is a block diagram that illustrates the overall operation of the CM system. The CM system 100 includes a CMN 101, a calculate loss function component 102, an update CMN component 103, an update latent vector component 104, and a generator $\mathcal{G}$ 105. The CM system receives observed images $Y^{obs}$ 113 corresponding to original images X 111 that have been corrupted during the collection process by an unknown function $f(X)$ 112 where $Y^{obs}=f(X)$. The goal of the CM system is to approximate a function $f^{-1}(Y^{obs})$ where $X=f^{-1}(Y^{obs})$. The CM system starts out by initializing a latent vector z 114 for each observed image. The CM system then applies the generator $\mathcal{G}$ to each latent vector z to generate a modeled image $\mathcal{G}(z)$ 115. The CM system iteratively trains the CMN and learns new latent vectors until an overall termination criterion is satisfied. During each overall iteration, the CM system both trains the CMN and learns new latent vectors. The training and the learning of each overall iteration are further iterative processes. When the overall termination criterion is satisfied, the modeled images $\mathcal{G}(z)$ 117 represent the uncorrupted versions of the observed images.

The CM system trains the CMN using the modeled images $\mathcal{G}(z)$ as input. During training of an overall iteration, the CM system iteratively (training iterations) applies the CMN to the modeled images $\mathcal{G}(z)$ to generate corrupted images $CMN(\mathcal{G}(z))$ 116. The modeled images $\mathcal{G}(z)$ are held constant during the training of one overall iteration. The CM system then uses the calculate loss function component to calculate a loss function based on differences between the corrupted images $CMN(\mathcal{G}(z))$ and the observed images $Y^{obs}$. The CM system uses the update CMN component to update parameters θ of the CMN by applying a gradient descent technique based on the loss function. The CM system iteratively applies the CMN using the parameters θ to the modeled images $\mathcal{G}(z)$, calculates the loss function, and updates the parameters θ until a training termination condition is satisfied.

The CM system iteratively (learning iterations) learns new latent vectors during an overall iteration until a learning termination criterion is satisfied. During each learning iteration, the CMS uses the update latent vector component to update the latent vectors z by applying a gradient descent technique based on the loss function given the last corrupted images $CMN(\mathcal{G}(z))$. The CM system then applies the generator to the latent vectors z to generate modeled images $\mathcal{G}(z)$. The CM system applies the CMN to the modeled images $\mathcal{G}(z)$ to generate new corrupted images $CMN(\mathcal{G}(z))$ to be used in the next learning iteration.

In some embodiments, the CM system may employ a generator trained using a GAN based on training images (real images) to generate uncorrupted images from latent vectors. A GAN includes a generator and discriminator. The generator inputs a latent vector of random noise and outputs a generated image (a fake image) based on current weights of the generator. The discriminator inputs the training images and a generated image and outputs a classification of whether the generated image is a real or fake image. Based on the indications, the weights of the generator are adjusted with the goal of each generated image being classified as real, and weights of the discriminator are adjusted with the goal of each generated image being classified as fake. After training is complete, the generator can be used to generate a "real" image given a latent vector. In addition, as described below, the loss function can be based on the discriminator. Alternatively, the CM system may employ a generator that is a decoder portion of an autoencoder that is trained using training images.

The CM system may be employed to account for corruption that occurs during the collection of images. For example, an unmanned vehicle may have a camera to collect images. For various reasons, such as environmental (e.g., fog), foreign substance on lens, or electromagnetic interference, the collected images may be corrupted in some way. The corruption may increase or decrease over time. The CM system may be used to account for the corruption using every collected image individually or collections of collected images. For example, for every group of 10 observed images, the CM system may be employed to train the CMN and learn latent vectors using the 10 observed images to generate 10 uncorrupted versions of the 10 observed images. When the next group of 10 observed images are collected, the CM system repeats the training and learning to again generate 10 uncorrupted images. The training of the CMN for the next group, however, may start with the parameters of the CMN resulting from training for the last group. Alternatively, the CMN may be trained on some observed images but later used without training to learn latent vectors and generate uncorrupted versions of other observed images. In such an alternative, the CM system need only perform one set of learning iterations for each observed image or collection of observed images.

Figure 2:
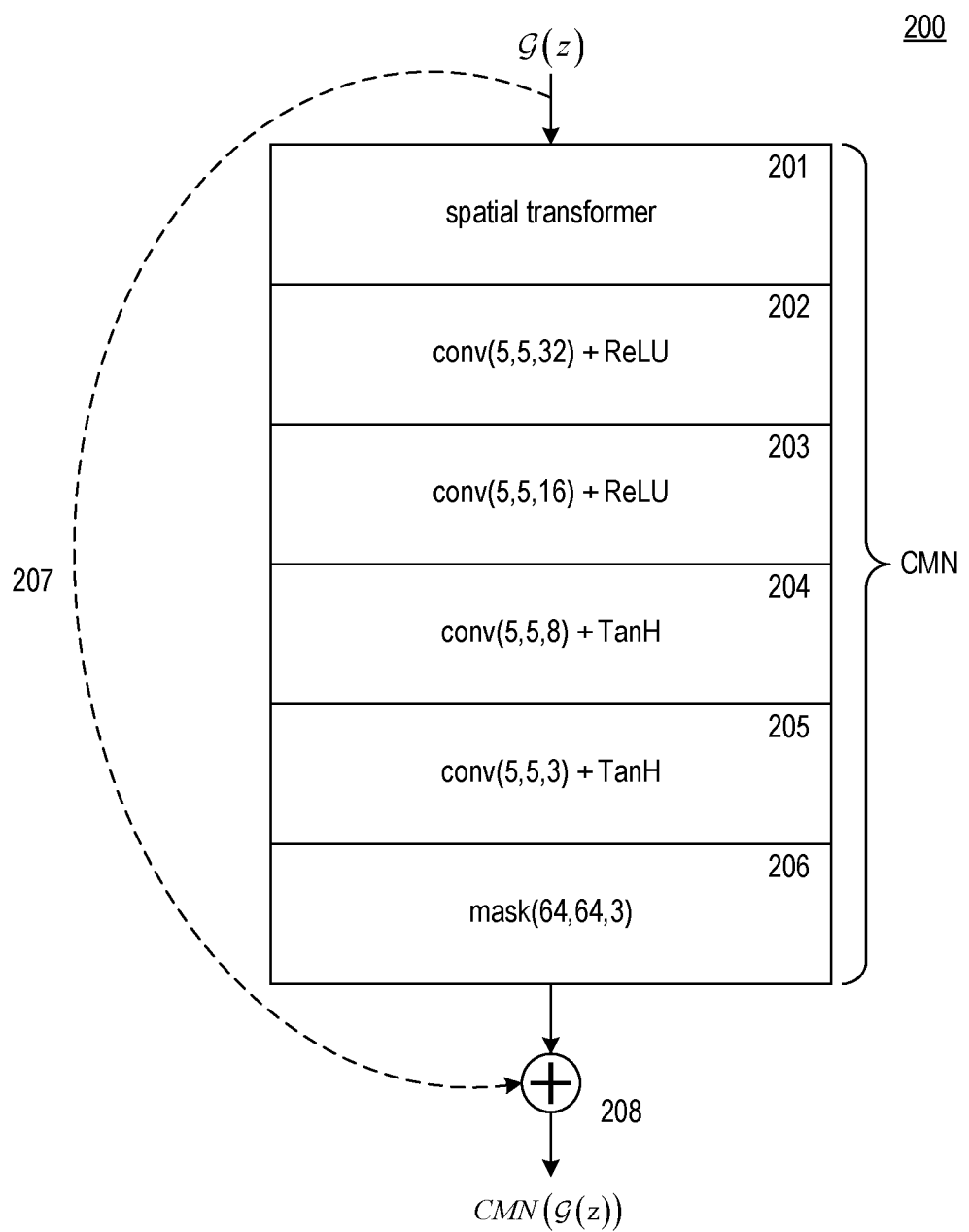
FIG. 2 is a block diagram illustrating an architecture of the CMN in some embodiments.

FIG. 2 is a block diagram illustrating an architecture of the CMN in some embodiments. The CMN 200 is a neural network that includes a spatial transformer layer 201, convolution layers 202-205, and a mask layer 206. The CMN inputs a modeled image $\mathcal{G}(z)$ and outputs a corrupted image $CMN(\mathcal{G}(z))$. The spatial transformer layer allows for modeling geometric image corruptions such as scale, rotation, and shift. The spatial transformer layer such as has 6 parameters that model affine transformations corresponding to scale, rotation, and shearing. The convolutional layers with non-linearities allow for the modeling of various image corruptions such as blurs, edges, color shifts, and so on. The mask layer allows for modeling of corruptions such as arbitrary masks, missing pixels, and noise. The mask layer is randomly initialized to the same size as the image. The CMN may also include a shortcut connection 207 to weighting component 208 to facility the identity transformation— when observed images are not corrupted.

The processing performed by CM system may be describe formally as follows. The generator of a pre-trained GAN may be represented as $\mathcal{G}:R^d \mapsto \mathcal{I}$, where $\mathcal{I}$ represents the image manifold and d is the dimensionality of the latent space. The observations (e.g., observed images) that is to be projected onto $\mathcal{I}$ is represented as $Y^{obs}=f(X)$, where $f(.)$ is some unknown corruption function, and $X \in \mathcal{I}$ is the true image on the manifold. The corruption function $f$ can correspond to a broad class of functions including geometric transformations (e.g., affine shift), missing information (e.g., missing pixels), or a systematic distributional shift (e.g., changes to pixel intensities). The CM system estimates X by projecting $Y^{obs}$ onto $\mathcal{I}$, without any prior knowledge about $f$ or paired examples representing the function. The observations $Y^{obs} = \{Y_1^{obs}, Y_2^{obs}, \ldots, Y_N^{obs}\}$, be N observations which are assumed to be produced by a corruption process $f$ along with an unknown noise component, i.e., $Y_j^{obs} = f(X_j) + \eta$, where $\eta$ denotes an independent and identically distributed. random process. This formulation allows for the N observations to be corrupted in slightly different ways.

In the special case where the corruption function $f$ is known a priori, the projection problem can be simplified:

$$\{z_j^*\}_{j=1}^N = \underset{\{z_j \in \mathbb{R}^d\}_{j=1}^N}{\arg\min} \sum_{j=1}^N \mathcal{L}(Y_j^{obs}, f(\mathcal{G}(z_j))), \quad (1)$$

where the optimal projections are given by $\hat{X}_j = \mathcal{G}(z^*_j)$, $\mathcal{L}$ is a loss function (e.g., mean squared error) for reconstructing the observations using the known $f$ and $z \in \mathbb{R}^d$ is the latent noise vector. This optimization problem can be solved using a projected gradient descent ("PGD") technique.

While Equation (1) is highly effective when $f$ is known, it fails dramatically when $f$ is unknown. In practice, this is often handled by making a naïve assumption that $f$ is identity and employing PGD tends to produce non-robust projections onto the image manifold, under a wide-range of commonly occurring corruptions. By producing highly unreliable projections, this eventually makes the GAN unusable in downstream applications.

The CM system helps overcome this problem by mimicking the corruption in a way that estimates the likely corruption function while simultaneously projecting the observations onto the image manifold. The CM system parameterizes the corruption function by a neural network, $\hat{f}$, that "mimics" the unknown corruption process, conditioned upon the current best estimate of the projection $\hat{X} \in \mathcal{I}$. The CM system then estimates that best possible projection $\hat{X}$ conditioned on the current estimate of the function $\hat{f}$ using Equation (1). This alternating optimization progresses by incrementally refining $\hat{f}$, while ensuring that there always exists a valid solution $\hat{X} \in \mathcal{I}$, such that $\hat{f}(\hat{X}) \approx Y^{obs}$. The CM system keeps the generator frozen during the entire optimization loop, and hence the CM system is implemented as an entirely test-time solution.

The CM system provides a solution that is applicable over a wide class of functions $f \in \mathcal{F}$, where $\mathcal{F}$ is the hypothesis space of corruption functions that can be modeled using a neural network. Equation (1) may be reformulated as follows:

$$f^*, \{z_j^*\}_{j=1}^N = \underset{\hat{f}, \{z_j \in \mathbb{R}^d\}_{j=1}^N}{\arg\min} \sum_{j=1}^N \mathcal{L}(Y_j^{obs}, \hat{f}(\mathcal{G}(z_j))), \quad (2)$$

Since both $\mathcal{G}$ and $\hat{f}$ are differentiable, the CM system can evaluate the gradients of the objective in Equation (2) using backpropagation and utilizing existing gradient-based optimizers. In addition to computing gradients with respect to $z_j$, the CM system may also perform clipping in order to restrict it within the desired range (e.g., [−1, 1]) resulting in a PGD-style optimization. By solving this alternating optimization problem, the CM system produces high quality estimates for both $\hat{f}$ and the projections $\hat{X}_j = \mathcal{G}(z^*_j) \forall j$.

The CM system employ a loss function as a measure of the differences between a corrupted image output by the CMN and an observed image. The loss function $\mathcal{L}$ in (2) comprised of two different terms: (1) a corruption-mimicking loss and (2) an adversarial loss.

The corruption-mimicking loss measures the discrepancy between the true observations $Y_j^{obs}$ and the estimates generated by the CMN and may be represented as follows:

$$\mathcal{L}_{obs} = \sum_{j=1}^N \left\| Y_j^{obs} - \hat{f}(\mathcal{G}(z_j)) \right\|_1$$

where $\|.\|_1$ is $\ell_1$ norm.

The adversarial loss employs the discriminator $\mathcal{D}$ and the generator $\mathcal{G}$ from the pre-trained GAN and may be represented as follows:

$$\mathcal{L}_{adv} = \sum_{j=1}^N \log(1 - \mathcal{D}(\mathcal{G}(z_j))).$$

This adversarial loss happens to be the same as the generator loss used for training a GAN. Given the corruption-mimicking loss and the adversarial loss, the overall loss may be represented as follows:

$$\mathcal{L} = \mathcal{L}_{obs} + \lambda_{adv} \mathcal{L}_{adv}, \quad (3)$$

where $\lambda_{adv}$ may be fixed at 1e−4. The projected gradient descent (PGD) technique can be derived as a special case when $\hat{f} = \mathbb{I}$, where $\mathbb{I}$ is identity.

The processing of the CM system may be represented by the algorithm of Table 1. Table 1 uses the term "surrogate" to refer to the CMN.

TABLE 1

Input : Observed Images $Y^{obs}$, Pre-trained generator $\mathcal{G}$ and discriminator $\mathcal{D}$,
Output : Recovered Images $\hat{X} \in \mathcal{I}$, Surrogate $\hat{f}$
Initialize : For all j, $\hat{z}_j$ is initialized as average of 1000 realizations drawn from U(−1, 1)/ / see text
Initialize: Random initialization of surrogate parameters, $\Theta$
for t ← 1 to T do
  for $t_1$ ← 1 to $T_1$ // update surrogate
  do
    $Y_j^{est} \leftarrow \hat{f}(\mathcal{G}(\hat{z}_j); \Theta), \forall j$;
    Compute loss $\mathcal{L}$ using (3);
    $\Theta \leftarrow \Theta - \gamma_s \nabla_\Theta (\mathcal{L})$;
  end
  for $t_2$ ← 1 to $T_2$ // perform PGD conditioned on surrogate
  do
    $Y_j^{est} \leftarrow \hat{f}(\mathcal{G}(\hat{z}_j); \Theta), \forall j$;
    Compute loss $\mathcal{L}$ using (3);
    $\hat{z}_j \leftarrow \hat{z}_j - \gamma_g \nabla_z(\mathcal{L}), \forall j$;
    $\hat{z}_j \leftarrow \mathcal{P}(\hat{z}_j) \forall j$;
  end
end
return $\hat{f}, \hat{X}_j = \mathcal{G}(\hat{z}_j), \forall j$.

The CM system executes the inner loops for updating $\hat{f}$ and $z_j$ and $T_1$ and $T_2$ number of iterations respectively. The projection operation denoted by $\mathcal{P}$ is the clipping operation, which may be restricted so that the $z_j$'s to lie in the range [−1, 1]. The CM system may employ a root means square propagation optimizer ("RMSProp Optimizer") to perform the gradient descent step in each case, with learning rates of $\gamma_s$ and $\gamma_g$ for the two steps respectively. Since the CM system requires only the observations $Y^{obs}$ to compute the projection, the CM system lends itself to a task-agnostic inference wherein the user does not need to specify the type of corruption or acquire examples a priori.

The CM system selects an initial latent vector to begin the alternating optimization. Depending on the initial latent vector that is selected, there may be large variabilities in convergence behavior.to the choice of the seed. To help reduce the variability, the CM system may select the initial latent vector by computing an average sample on the image manifold, for example, by averaging 1000 samples drawn from the random uniform distribution. When the latent space is drawn from a uniform distribution, this effectively initializes the latent vectors with zero values. The CM system may initialize latent vectors for all observations with the same average.

The computing systems on which the CM system may be implemented may include a central processing unit, input devices, output devices (e.g., display devices and speakers), storage devices (e.g., memory and disk drives), network interfaces, graphics processing units, accelerometers, cellular radio link interfaces, global positioning system devices, and so on. The computing systems may include servers of a data center, massively parallel systems, and so on. The computing systems may access computer-readable media (mediums) that include computer-readable storage media and data transmission media. The computer-readable storage media are tangible storage means that do not include a transitory, propagating signal. Examples of computer-readable storage media include memory such as primary memory, cache memory, and secondary memory (e.g., DVD) and other storage. The computer-readable storage media may have recorded on them or may be encoded with computer-executable instructions or logic that implements the CM system. The data transmission media are used for transmitting data via transitory, propagating signals or carrier waves (e.g., electromagnetism) via a wired or wireless connection.

The CM system may be described in the general context of computer-executable instructions, such as program modules and components, executed by one or more computers, processors, or other devices. Generally, program modules or components include routines, programs, objects, data structures, and so on that perform particular tasks or implement particular data types. Typically, the functionality of the program modules may be combined or distributed as desired in various embodiments. Aspects of the CM system may be implemented in hardware using, for example, an application-specific integrated circuit (ASIC).

Figure 3:
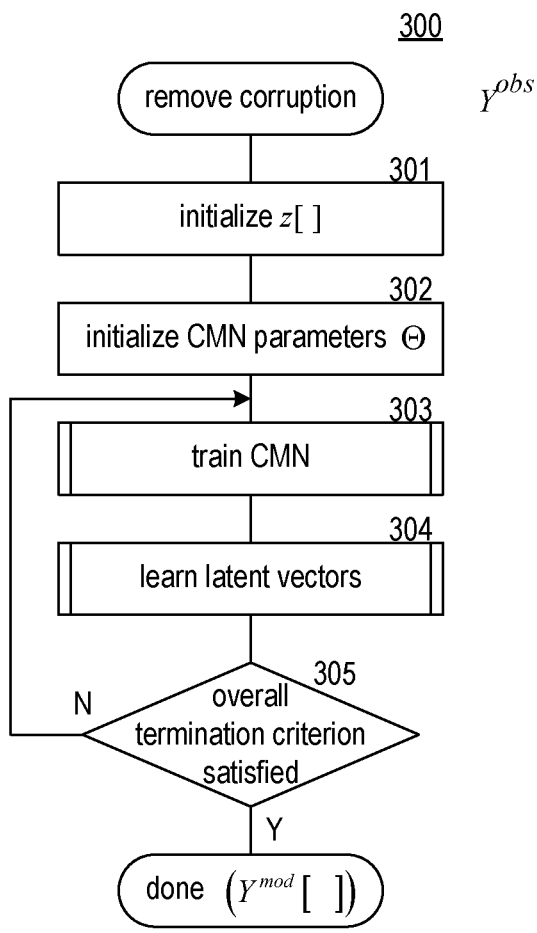
FIG. 3 is a flow diagram that illustrates the processing of the remove corruption component of the CM system in some embodiments.

FIG. 3 is a flow diagram that illustrates the processing of the remove corruption component of the CM system in some embodiments. The remove corruption component 300 is provided a collection of observed images and output uncorrupted versions of the observed images. In block 301, the component initializes a latent vector for each observed image. In block 302, the component initializes the parameters of the CMN. In blocks 303-305, the component loops performing overall iterations until an overall termination criterion is satisfied. In block 303, the component invokes a train CMN component to update the parameters of the CMN. In block 305, the component invokes an learn latent vectors component to update the latent vectors. In decision block 305, the overall termination criterion is satisfied, then the component completes indicating the modeled images as the uncorrupted versions of the observed images, else the component loops to block 503 to start another overall iteration.

Figure 4:
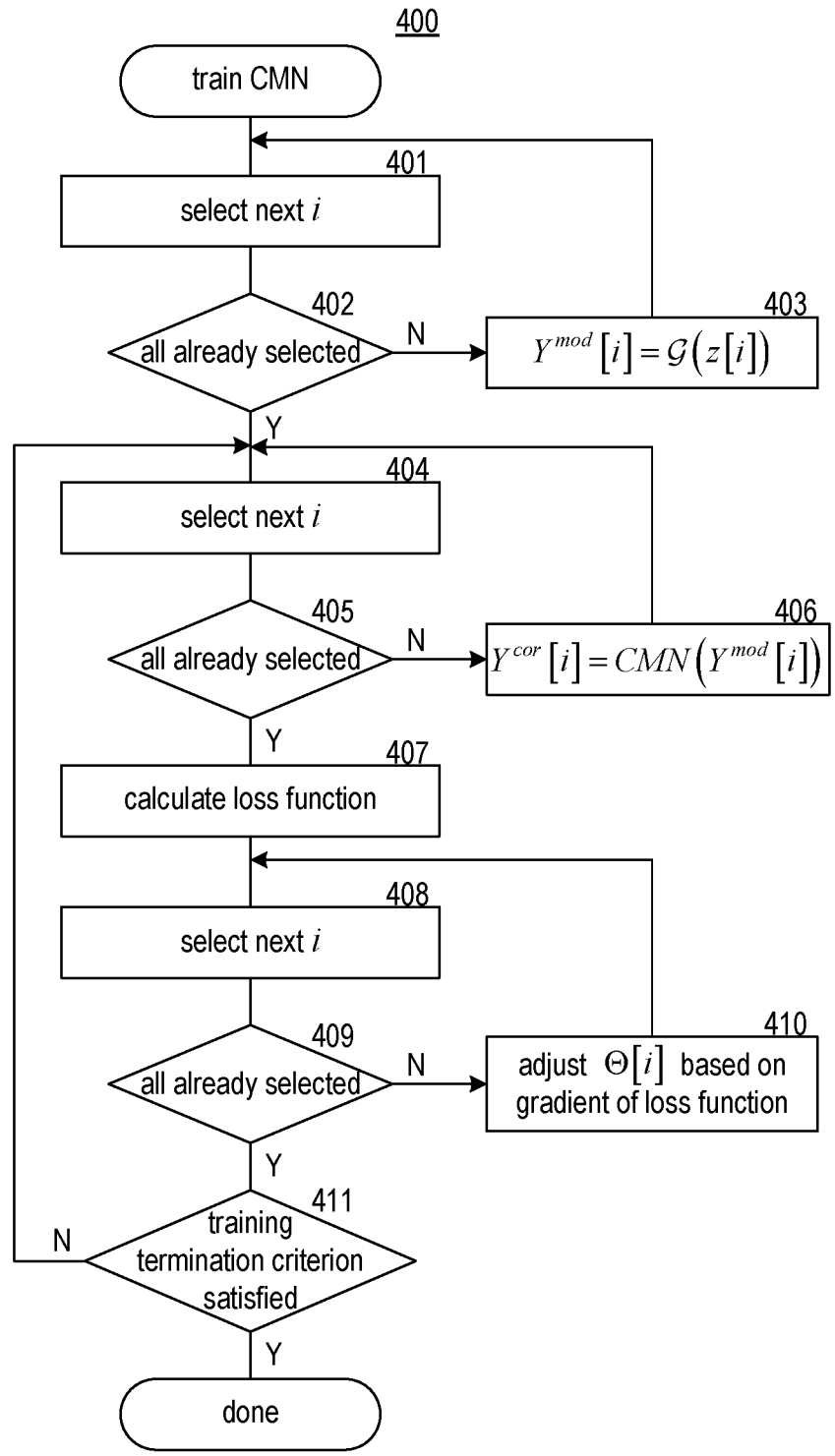
FIG. 4 is a flow diagram that illustrates the processing of a train CMN component of the CM system in some embodiments.

FIG. 4 is a flow diagram that illustrates the processing of a train CMN component of the CM system in some embodiments. The train CMN component 400 updates the parameters of the CMN. In block 401, the component increments an index to index through the observed images. In decision block 402, if all the observed images have already been indexed, then the component continues at block 404, else the component continues at block 403. In block 403, the component applies the generator to the latent vector for the indexed observed image to generate a modeled image for the indexed observed image and loops to block 401. In blocks 404-411, the component loops performing training iterations. In block 404, the component increments an index to index through the observed images. In decision block 405, if all the observed images have already been indexed, then the component continues at block 407, else the component continues at block 406. In block 406, the component applies the CMN to the modeled image to generate a corrupted image and then loops to block 404. In block 407, the component calculates a loss function. In block 408, the component increments an index to index through the observed images. In decision block 409, if all the observed images have already been indexed, then the component continues at block 411, else the component continues at block 410. In block 410, the component adjusts the parameters of the CMN based on the gradient of the loss function and then loops to block 408. In decision block 411, if the training termination criterion is satisfied, then the component completes, else the component loops to block 404 to start the next training iteration.

Figure 5:
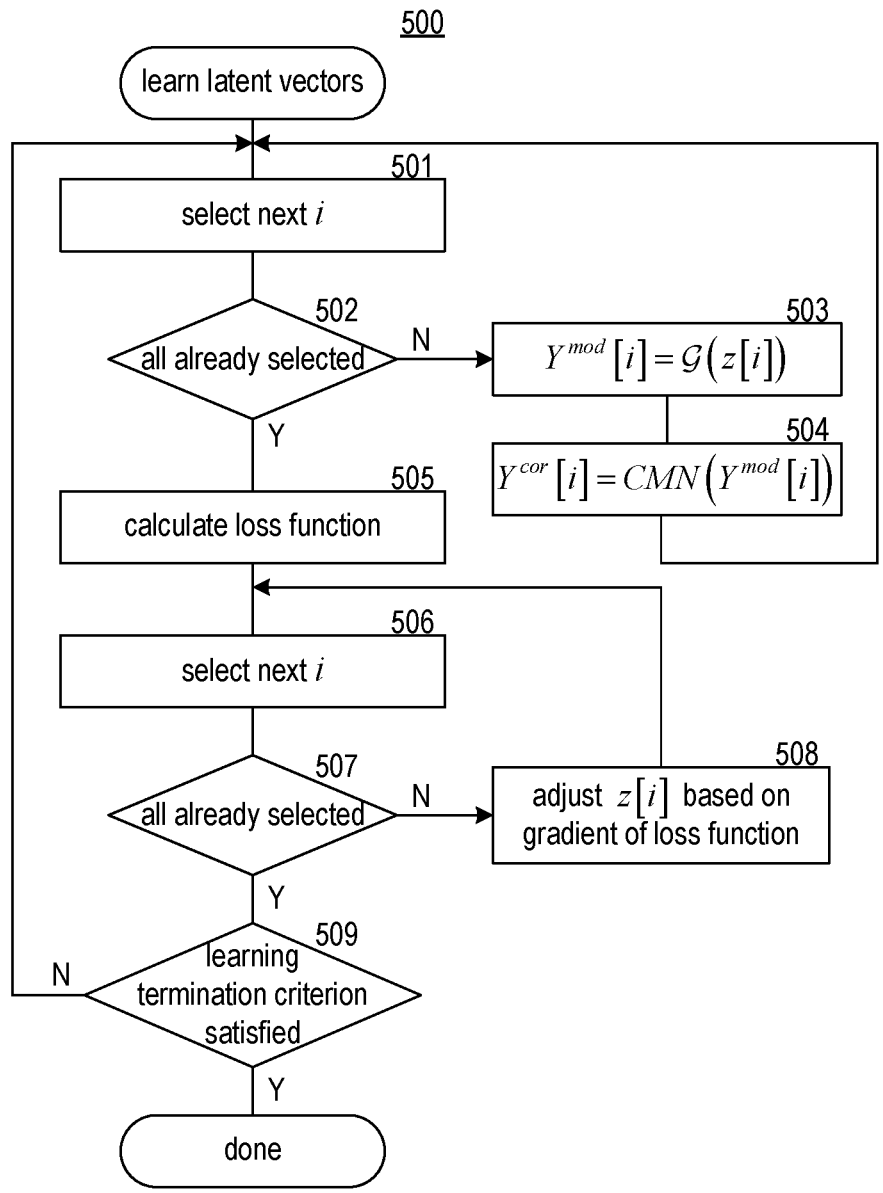
FIG. 5 is a flow diagram that illustrates the processing of a learn latent vectors component of the CM system in some embodiments.

FIG. 5 is a flow diagram that illustrates the processing of a learn latent vectors component of the CM system in some embodiments. The learn latent vector component 500 is invoked to learn the latent vectors given a trained CMN. The learned latent vectors are used to generate the modeled images that are used when training the CMN during the next overall iteration. In blocks 501-509, the component loops performing learning iterations. In block 501, the component increments an index to index through the observed images. In decision block 502, if all the observed images have already been selected, then the component continues at block 505, else the component continues at block 503. In block 503, the component applies the generator to a latent vector for the selected observed image to generate a modeled image. In block 504, the component applies the CMN to the modeled image to generate a corrupted image and then loops at block 501. In block 505, the component calculates the loss function. In block 506, the component increments an index to index through the observed images. In decision block 507, if all the observed images have already been selected, then the component continues at block 509, else the component continues at block 508. In block 508, the component adjusts the latent vectors for the indexed observed images based on a gradient of the loss function and loops to block 506. In decision block 509, if a learning termination criterion is satisfied, then the component completes, else the component loops to block 501 to start the next learning iteration.

The following paragraphs describe various embodiments of aspects of the CM system. An implementation of the CM system may employ any combination of the embodiments. The processing described below may be performed by a computing device with a processor that executes computer-executable instructions stored on a computer-readable storage medium that implements the CM system.

In some embodiments, a method performed by one or more computing systems is provided for training a corruption mimicking model to model corruption of observed images. The method updates parameters of the corruption mimicking model to by iteratively performing the following. The method generates modeled images by applying a generative model to latent vectors. The latent vectors represent points in an image space. The method generates corrupted images by applying the corruption mimicking model based on the parameters to the modeled images. The method then adjusts the parameters of the corruption mimicking model based on differences between the corrupted images and the observed images. After updating the parameters, the method updates the latent vectors by iteratively performing the following. The method generates modeled images by applying the generative model to the latent vectors. The method generates generating corrupted images by applying the corruption mimicking model based on the parameters to the modeled images. The method then adjusts the latent vectors based on differences between the corrupted images and observed images. In some embodiments, the updating of the parameters followed by the updating of the latent vectors is performed iteratively until an overall termination criterion is satisfied indicating that training of the corruption mimicking model is complete. In some embodiments, the adjusting of parameters is based on differences between the corrupted images and the observed images is further based on a gradient of a loss function that is based on the differences. In some embodiments, the adjusting of latent vectors is based on differences between the corrupted images and the observed images is further based on a gradient of a loss function that is based on the differences. In some embodiments, the loss function is further based on output of a discriminator of a generative adversarial network applied to a modeled image generated by applying the generative model to the latent vectors. In some embodiments, the generative model is a generator of a generative adversarial network that is trained using training images. In some embodiments, the generative model is the encoder of an autoencoder that is trained using training images. In some embodiments, when the training of corruption mimicking model is complete, the modeled images that were last generated represent uncorrupted images corresponding to the observed images. In some embodiments, the method further applies a characteristic identifier to an uncorrupted image to identify a characteristic of the uncorrupted image. In some embodiments, the method further when the training of the corruption mimicking model is complete, generates an uncorrupted target image corresponding to an observed target image by repeating, until a termination criterion is satisfied, the following. The method generates a modeled target image by applying the generative model to a target latent vector representing the uncorrupted target image. The method generates a corrupted target image by applying the corruption mimicking model based on the parameters to the modeled target image. The method then adjusts adjusting the target latent vector based on differences between the corrupted target image and the observed target image. When the termination criterion is satisfied, the last modeled target image that was generated represents the uncorrupted target image. In some embodiments, the method further applies a characteristic identifier to the uncorrupted target image to identify a characteristic of the observed target image.

In some embodiments, a method performed by one or more computing systems is provided for generating an uncorrupted target image corresponding to an observed target image. The method iteratively performs, until a termination criterion is satisfied, the following. The method generates modeled target image by applying a generative model to a target latent vector representing the uncorrupted target image. The generative model is trained using training images. The method generates a corrupted target image by applying a corruption mimicking model based on parameters to the modeled target image. The method adjusts the target latent vector based on differences between the corrupted target image and the observed target image. The last modeled target image generated represents the uncorrupted target image. In some embodiments, the corruption mimicking model is trained to mimic corruption based on iteratively updating parameters of the corruption mimicking model based on differences between observed images and corresponding corrupted images generated by applying corruption mimicking model to modeled images that are generated from latent vectors updated based on differences between the observed images and corrupted images. In some embodiments, the method further retrains the corruption mimicking model during collection of observed images based on recently collected observed images. In some embodiments, the method adjusts the parameters during the generating of the uncorrupted target image based on differences the corrupted target image and the observed target image.

In some embodiments, one or more computing systems are provided for training a corruption mimicking model to model corruption of observed images. The one or more computing systems include one or more computer-readable storage mediums for storing computer-executable instructions for controlling the one or more computing systems and one or more processors for executing the computer-executable instructions stored in the one or more computer-readable storage mediums. The instructions update parameters of the corruption mimicking model based on differences between corrupted images and the observed images, the corrupted images generated by applying the corruption mimicking model with the parameters prior to updating to modeled images. The instructions generate the modeled images by applying a generative model to latent vectors generated based on the differences between the corrupted images and the observed images. The instructions update latent vectors based on differences between the corrupted images and the observed images. The instructions generate the corrupted images by applying the corruption mimicking model with the parameters to modeled images. The instructions generate the modeled images generated by applying the generative model to the latent vectors prior to the update. In some embodiments, the update of the parameters followed by the update of the latent vectors is performed iteratively until an overall termination criterion is satisfied indicating that training of the corruption mimicking model is complete. In some embodiments, the adjusting of parameters is based on differences between the corrupted images and the observed images is further based on a gradient of a loss function that is based on the differences. In some embodiments, the loss function is further based on output of a discriminator applied to a modeled image. The generative model and the discriminator are trained using training images based on a generative adversarial network. In some embodiments, the adjusting of latent vectors is based on differences between the corrupted images and the observed images is further based on a gradient of a loss function that is based on the differences. In some embodiments, the loss function is further based on output of a discriminator applied to a modeled image. The generative model and the discriminator are trained using training images based on a generative adversarial network. In some embodiments, the generative model is a generator of a generative adversarial network that is trained using training images. In some embodiments, the generative model is the encoder of an autoencoder that is trained using training images. In some embodiments, when the training of corruption mimicking model is complete, the modeled images that were last generated represent uncorrupted images corresponding to the observed images. In some embodiments, the instructions further apply a characteristic identifier to an uncorrupted image corresponding to an observed image to identify a characteristic of the observed image. In some embodiments, the instructions further when the training of the corruption mimicking model is complete, generate an uncorrupted target image corresponding to an observed target image by repeating until a termination criterion, is satisfied, generate a modeled target image by applying the generative model to a target latent vector representing the uncorrupted target image, generate a corrupted target image by applying the corruption mimicking model based on the parameters to the modeled target image, and adjust the target latent vector based on differences between the corrupted target image and the observed target image. When the termination criterion is satisfied, the last modeled target image that was generated represents the uncorrupted target image. In some embodiments, the instructions further apply a characteristic identifier to the uncorrupted target image to identify a characteristic of the observed target image.

Although the subject matter has been described in language specific to structural features and/or acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

We claim:

1. A method performed by one or more computing systems for training a corruption mimicking model to model corruption of observed images, the method comprising:
   updating parameters of the corruption mimicking model by iteratively:
      generating modeled images by applying a generative model to latent vectors, the latent vectors representing points in an image space;
      generating corrupted images by applying the corruption mimicking model based on the parameters to the modeled images; and
      adjusting the parameters of the corruption mimicking model based on differences between the corrupted images and the observed images; and
   updating the latent vectors by iteratively:
      generating modeled images by applying the generative model to the latent vectors;
      generating corrupted images by applying the corruption mimicking model based on the parameters to the modeled images; and
      adjusting the latent vectors based on differences between the corrupted images and observed images.

2. The method of claim 1 wherein the updating of the parameters followed by the updating of the latent vectors is performed iteratively until an overall termination criterion is satisfied indicating that training of the corruption mimicking model is complete.

3. The method of claim 1 wherein the adjusting of parameters is based on differences between the corrupted images and the observed images is further based on a gradient of a loss function that is based on the differences.

4. The method of claim 1 wherein the adjusting of latent vectors is based on differences between the corrupted images and the observed images is further based on a gradient of a loss function that is based on the differences.

5. The method of claim 4 wherein the loss function is further based on output of a discriminator of a generative adversarial network applied to a modeled image generated by applying the generative model to the latent vectors.

6. The method of claim 1 wherein the generative model is a generator of a generative adversarial network that is trained using training images.

7. The method of claim 1 wherein the generative model is the encoder of an autoencoder that is trained using training images.

8. The method of claim 1 wherein when the training of corruption mimicking model is complete, the modeled images that were last generated represent uncorrupted images corresponding to the observed images.

9. The method of claim 8 further comprising applying a characteristic identifier to an uncorrupted image to identify a characteristic of the uncorrupted image.

10. The method of claim 1 further comprising when the training of the corruption mimicking model is complete, generating an uncorrupted target image corresponding to an observed target image by repeating until a termination criterion is satisfied:
    generating a modeled target image by applying the generative model to a target latent vector representing the uncorrupted target image;
    generating a corrupted target image by applying the corruption mimicking model based on the parameters to the modeled target image; and
    adjusting the target latent vector based on differences between the corrupted target image and the observed target image,
    wherein when the termination criterion is satisfied, the last modeled target image that was generated represents the uncorrupted target image.

11. The method of claim 10 further comprising applying a characteristic identifier to the uncorrupted target image to identify a characteristic of the observed target image.

12. A method performed by one or more computing systems for generating an uncorrupted target image corresponding to an observed target image, the method comprising iteratively performing until a termination criterion is satisfied:
    generating a modeled target image by applying a generative model to a target latent vector representing the uncorrupted target image, the generative model trained using training images;
    generating a corrupted target image by applying a corruption mimicking model based on parameters to the modeled target image; and
    adjusting the target latent vector based on differences between the corrupted target image and the observed target image,
    wherein the last modeled target image generated represents the uncorrupted target image.

13. The method of claim 12 wherein the corruption mimicking model is trained to mimic corruption based on iteratively updating parameters of the corruption mimicking model based on differences between observed images and corresponding corrupted images generated by applying corruption mimicking model to modeled images that are generated from latent vectors updated based on differences between the observed images and corrupted images.

14. The method of claim 13 wherein the corruption mimicking model is retrained during collection of observed images based on recently collected observed images.

15. The method of claim 13 wherein the parameters are adjusted during the generating of the uncorrupted target image based on differences the corrupted target image and the observed target image.

16. One or more computing systems for training a corruption mimicking model to model corruption of observed images, the one or more computing systems comprising:
one or more computer-readable storage mediums for storing computer-executable instructions for controlling the one or more computing systems to:
update parameters of the corruption mimicking model based on differences between corrupted images and the observed images, the corrupted images generated by applying the corruption mimicking model with the parameters prior to updating to modeled images, the modeled images generated by applying a generative model to latent vectors generated based on the differences between the corrupted images and the observed images; and
update latent vectors based on differences between the corrupted images and the observed images, the corrupted images generated by applying the corruption mimicking model with the parameters to modeled images, the modeled images generated by applying the generative model to the latent vectors prior to the update; and
one or more processors for executing the computer-executable instructions stored in the one or more computer-readable storage mediums.

17. The one or more computing systems of claim 16 wherein the update of the parameters followed by the update of the latent vectors is performed iteratively until an overall termination criterion is satisfied indicating that training of the corruption mimicking model is complete.

18. The one or more computing systems of claim 16 wherein the adjusting of parameters is based on differences between the corrupted images and the observed images is further based on a gradient of a loss function that is based on the differences.

19. The one or more computing systems of claim 18 wherein the loss function is further based on output of a discriminator applied to a modeled image, the generative model and the discriminator are trained using training images based on a generative adversarial network.

20. The one or more computing systems of claim 16 wherein the adjusting of latent vectors is based on differences between the corrupted images and the observed images is further based on a gradient of a loss function that is based on the differences.

21. The one or more computing systems of claim 20 wherein the loss function is further based on output of a discriminator applied to a modeled image, the generative model and the discriminator are trained using training images based on a generative adversarial network.

22. The one or more computing systems of claim 16 wherein the generative model is a generator of a generative adversarial network that is trained using training images.

23. The one or more computing systems of claim 16 wherein the generative model is the encoder of an autoencoder that is trained using training images.

24. The one or more computing systems of claim 16 wherein when the training of corruption mimicking model is complete, the modeled images that were last generated represent uncorrupted images corresponding to the observed images.

25. The one or more computing systems of claim 24 wherein the instructions further apply a characteristic identifier to an uncorrupted image corresponding to an observed image to identify a characteristic of the observed image.

26. The one or more computing systems of claim 16 wherein the instructions further when the training of the corruption mimicking model is complete, generate an uncorrupted target image corresponding to an observed target image by repeating until a termination criterion is satisfied:
generate a modeled target image by applying the generative model to a target latent vector representing the uncorrupted target image;
generate a corrupted target image by applying the corruption mimicking model based on the parameters to the modeled target image; and
adjust the target latent vector based on differences between the corrupted target image and the observed target image,
wherein when the termination criterion is satisfied, the last modeled target image that was generated represents the uncorrupted target image.

27. The one or more computing systems of claim 26 wherein the instructions further apply a characteristic identifier to the uncorrupted target image to identify a characteristic of the observed target image.

28. A method performed by one or more computing systems for generating an uncorrupted image corresponding to an observed image that is corrupted, the method comprising:
iteratively performing based on one or more parameters:
generating a modeled image based on a representation of an uncorrupted image;
generating a corrupted image from the modeled image;
adjusting one or more parameters based on differences between the corrupted image and the observed image; and
generating a new representation of the uncorrupted image.

29. The method of claim 28 wherein the generated modeled image converges on a representation of the uncorrupted image corresponding to the observed image.

30. The method of claim 28 wherein the generating of a modeled image generates a plurality of modeled images that are each generated based on a representation of an uncorrupted image.

31. The method of claim 28 wherein the generating of a corrupted image generates a plurality of corrupted images that are each generated based on a modeled image.

32. The method of claim 28 wherein the representation of the uncorrupted image is a latent vector.

33. The method of claim 28 further comprising during an iteration, training a corruption mimicking component that inputs modeled images and outputs corrupted images by adjusting parameters of the corruption mimicking component based on differences between the corrupted images and observed images.

34. The method of claim 28 further comprising during an iteration, training a latent vector component that inputs corrupted images and outputs latent vectors by generating modeled images from the latent vectors, generating corrupted images from the modeled images, and adjusting parameters of the latent vector component based on differences between the corrupted images and the observed images.

35. The method of claim 28 wherein the generating of the corrupted image includes applying corruption mimicking component to the modeled image wherein the corruption mimicking component is trained during each iteration.

36. One or more computing systems for generating uncorrupted images corresponding to observed images that are corrupted, the one or more computing systems comprising:
one or more computer-readable storage mediums for storing computer- executable instructions for controlling the one or more computing systems to:
apply a generator to representations of uncorrupted images to generate modeled images;
apply a corruption mimicking component to the modeled images to generate corrupted images from the modeled images; and
learn new representations of the uncorrupted images based on differences between the corrupted images and the observed images; and
one or more processors for executing the computer-executable instructions stored in the one or more computer-readable storage mediums.

37. The one or more computing systems of claim 36 wherein a representation of an uncorrupted image is a latent vector.

38. The one or more computing systems of claim 36 wherein the instructions further train the corruption mimicking component by iteratively inputting the modeled images, outputting corrupted images, and adjusting parameters of the corruption mimicking component based on differences between the output corrupted images and the observed images.

39. The one or more computing systems of claim 38 wherein the instructions that learn new representations further train a representation component by iteratively inputting first corrupted images, outputting representations of the uncorrupted images corresponding to the first corrupted images, generating modeled images from the representations, applying the corruption mimicking component to generate second corrupted images from the modeled images, and adjusting parameters of the representation component based on differences between the second corrupted images and observed images.

40. The one or more computing systems of claim 36 wherein the instructions that learn new representations further train a representation component by iteratively inputting first corrupted images, outputting representations of the uncorrupted images corresponding to the first corrupted images, generating modeled images from the representations, applying the corruption mimicking component to generate second corrupted images from the modeled images, and adjusting parameters of the representation component based on differences between the second corrupted images and observed images.

41. The one or more computing systems of claim 36 wherein the applying of the generator, the applying of corruption mimicking component, and the learning of the new representations are performed iteratively until the corrupted images converge on the observed images.

42. The one or more computing systems of claim 41 wherein the corruption mimicking network is trained during each iteration.

43. One or more computing systems for generating uncorrupted images corresponding to observed images that are corrupted, the one or more computing systems comprising:
one or more computer-readable storage mediums for storing computer- executable instructions for controlling the one or more computing systems to:
apply a generator to representations of uncorrupted images to generate modeled images;
train a corruption mimicking component that inputs the modeled images and outputs corrupted images by adjusting parameters of the corruption mimicking component based on differences between the corrupted images and the observed images the modeled images; and
generate new representations of the uncorrupted images based on differences between the corrupted images output by the corruption mimicking component and the observed images; and
one or more processors for executing the computer-executable instructions stored in the one or more computer-readable storage mediums.

44. The one or more computing systems of claim 43 further comprising instructions that learn new representations of the uncorrupted images based on differences between the corrupted images and the observed images.

45. The one or more computing systems of claim 44 wherein the instructions that learn new representations further train a representation component by iteratively inputting first corrupted images, outputting representations of the uncorrupted images based on the first corrupted images, generating modeled images from the representations, applying the corruption mimicking component to generate second corrupted images from the modeled images, and adjusting parameters of the representation component based on differences between the second corrupted images and observed images.

* * * * *